United States Patent
Al-Saraj

(10) Patent No.: US 9,433,297 B2
(45) Date of Patent: Sep. 6, 2016

(54) SEAT CUSHION WITH A PRAYER REMINDER SYSTEM

(71) Applicant: Effat Al-Saraj, Arlington, VA (US)

(72) Inventor: Effat Al-Saraj, Arlington, VA (US)

(*) Notice: Subject to any disclaimer, the term of this patent is extended or adjusted under 35 U.S.C. 154(b) by 11 days.

(21) Appl. No.: 14/606,796

(22) Filed: Jan. 27, 2015

(65) Prior Publication Data

US 2016/0213151 A1 Jul. 28, 2016

(51) Int. Cl.
| | | |
|---|---|---|
| G08B 21/00 | (2006.01) | |
| A47C 7/02 | (2006.01) | |
| A47G 33/00 | (2006.01) | |
| G08B 3/10 | (2006.01) | |
| G08B 5/36 | (2006.01) | |
| G08B 6/00 | (2006.01) | |
| G01G 19/44 | (2006.01) | |
| G01G 19/52 | (2006.01) | |

(52) U.S. Cl.
CPC ............ *A47C 7/02* (2013.01); *A47G 33/008* (2013.01); *G01G 19/44* (2013.01); *G01G 19/52* (2013.01); *G08B 3/10* (2013.01); *G08B 5/36* (2013.01); *G08B 6/00* (2013.01)

(58) Field of Classification Search
CPC . A47C 7/00; A47C 7/02–7/35; G01G 19/44; G01G 19/52; A47G 33/00; A47G 33/008
See application file for complete search history.

(56) References Cited

U.S. PATENT DOCUMENTS

| | | | | |
|---|---|---|---|---|
| 6,362,740 | B1* | 3/2002 | Jung | G08B 3/1041 340/573.1 |
| 2004/0195874 | A1 | 10/2004 | Lee | |
| 2005/0073911 | A1* | 4/2005 | Barnett | A47G 33/008 368/10 |
| 2005/0237859 | A1* | 10/2005 | Jibrin | G04G 15/006 368/47 |
| 2010/0177601 | A1* | 7/2010 | Kim | G01C 21/20 368/14 |
| 2014/0269215 | A1* | 9/2014 | Almirall | G04F 1/005 368/9 |
| 2015/0127224 | A1* | 5/2015 | Tabe | B60R 22/48 701/45 |
| 2015/0370285 | A1* | 12/2015 | Almosa | G04G 21/025 434/245 |

FOREIGN PATENT DOCUMENTS

| | | |
|---|---|---|
| CN | 201153762 Y | 11/2008 |
| CN | 202425984 U | 9/2012 |
| CN | 202941757 U | 5/2013 |

OTHER PUBLICATIONS

Lishuang Xu et al., "A Sensing Cushion Using Simple Pressure Distribution Sensors," 2012 IEEE International Conference on Multisensor Fusion and Integration for Intelligent Systems (MFI), 2012, 1 page.

Darma Inc., "Sit Smart for a Healthy Body and Mind," http://darma.co/#page1, 8 pages.

\* cited by examiner

*Primary Examiner* — Ryan Sherwin

(74) *Attorney, Agent, or Firm* — Oblon, McClelland, Maier & Neustadt, L.L.P.

(57) ABSTRACT

A seat cushion includes a sensor housed within the seat cushion for generating an output signal in response to detecting a load. The seat cushion also includes an alarm device and a microcontroller configured to receive the output signal from the sensor and activate the alarm device at predetermined times. The predetermined times are based on the five Islamic prayer times.

9 Claims, 7 Drawing Sheets

SEAT CUSHION WITH A PRAYER REMINDER SYSTEM

GRANT OF NON-EXCLUSIVE RIGHT

This application was prepared with financial support from the Saudia Arabian Cultural Mission, and in consideration therefore the present inventor has granted The Kingdom of Saudi Arabia a non-exclusive right to practice the present invention.

TECHNICAL FIELD

The present disclosure relates to a seat cushion with a prayer reminder system.

BACKGROUND

A person spends long hour sitting on a chair performing various activities. On average, an adult spends 50 to 70 percent of his time sitting. Other than sitting at work and for meals and commuting, the person may sit to watch television, to play games, to lounge, to read or to use his home computer. The person sitting may not pay attention to the time. In certain situations, the person may need to pray at a fixed time. For example, in Islam each person needs to perform prayers five times a day. These prayers are each assigned to certain predetermined times at which they must be performed. In other situations, the person may need to take a medicament at a predetermined time. In many situations, the person may not pay attention to the time. Other devices such as smart phones or watches may not be next to the person while sitting. Accordingly, it will be beneficial as recognized by the present inventor if a seat cushion is equipped with an alarm system that detects a user presence and alerts the user at predetermined times.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

A seat cushion with a prayer reminder system that comprises a sensor housed within the seat cushion for generating an output signal in response to detecting a load, an alarm device wherein the alarm device generates auditory and non-auditory signals, and a microcontroller configured to receive the output signal from the sensor and activate the alarm device at predetermined times wherein the predetermined to five Islamic prayer times determined based on the seat cushion location and a current date and time, and the signals from the alarm device are as pre-programmed by a user for a prayer time that corresponds with the current time.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
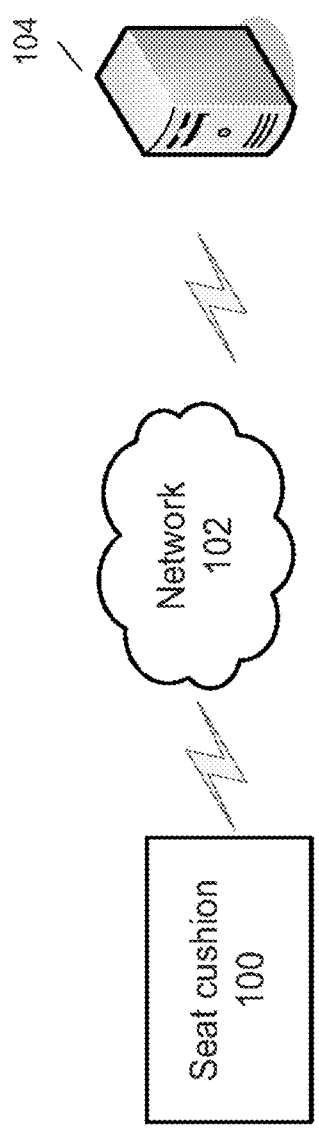
FIG. 1 is a schematic diagram that shows a seat cushion with a prayer reminder system according to one example.

Referring now to the drawings, wherein like reference numerals designate identical or corresponding parts throughout several views, the following description relates to a seat cushion with a prayer reminder system and associated methodology for determining when a user is sitting on the seat cushion and for triggering an alarm at predetermined times.

Most people spend too much time in front of a desk, computer or television. Often, they are too occupied with the job they are working on, the game they are playing, or the television program they are watching to pay attention on the time. Many activities may need to be performed at the predetermined times.

In one embodiment, the main function of the seat cushion with the prayer reminder system is to alert the user to prayer times which are performed five times each day. It also registers and alerts the user about a total time one spends continuously sitting on the seat cushion.

The seat cushion with the prayer reminder system is a multifunction sensor for reminding the user of Islamic prayer times. In other embodiments, the seat cushion may be used to alert the user for other activities. The seat cushion with the prayer reminder system can be programed to different times for different activities. In addition, the seat cushion with the prayer reminder system may be used by parents to monitor children sitting time. The parents may also set the predetermined times to alert their children to get up. The seat cushion with the prayer reminder system includes a microcontroller board to be continuously connected to a sensor in order to be used for registering duration of a certain activity. The cushion prayer may also include a memory. In selected embodiments, the memory may be removed from the cushion prayer and inserted into a personal computer.

The seat cushion may be portable. In other embodiments, the system may be integrated into existing furniture during manufacturing.

FIG. 1 is a schematic diagram that shows the seat cushion with the prayer reminder system according to one example. The seat cushion 100 may communicate with a server 104 via a network 102. The seat cushion 100, using communication circuitry, may download from the server 104 the predetermined times that corresponds with a certain date. In one example, a predetermined time may correspond to a pre-dawn prayer time. For example, the pre-dawn prayer time for Oct. 28, 2014 may be 6:18 am and the pre-dawn prayer time for Oct. 29, 2014 may be 6:19 am. Further, the predetermined times may also be related to the user location. For example, the prayer times in Islam depend on the condition of the sun and geography. Hence, the prayer times vary at different locations on the earth. For example, the pre-dawn prayer time may be at 6.19 am in Virginia and at 6:47 am in Ohio. Thus, the seat cushion 100 may further include location detection circuitry to determine the user location. For example, Global Positioning System (GPS) circuitry may be included within the seat cushion 100 to detect the location as would be understood by one of ordinary skill in the art. The seat cushion may send the location to the server 104. The server 104 may process the information and send the predetermined times to the seat cushion 100 via the network 102. The seat cushion 100 may also send information about a user log to the server 104.

Figure 2:
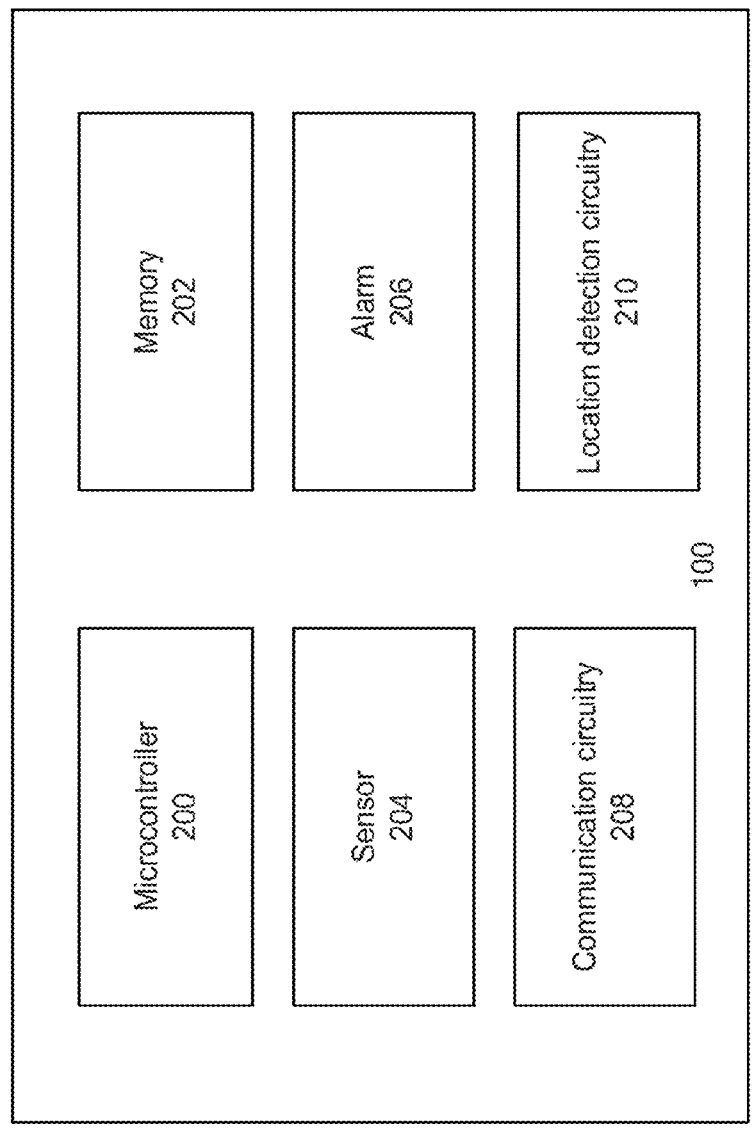
FIG. 2 is a block diagram representation of a seat cushion with a prayer reminder system according to one example.

FIG. 2 is a block diagram representation of the seat cushion with the prayer reminder system. The seat cushion 100 may include the microcontroller 200, the memory 202, a sensor 204, an alarm 206, communication circuitry 208, and the location detection circuitry 210. The seat cushion 100 may also include a power source such as a battery. The battery may be a rechargeable battery. The battery powers the microcontroller 200, the sensor 204, the alarm 206, the communication circuitry 208, and the location detection circuitry 210. In other embodiments, power for the seat cushion 100 may be supplied by plugging the seat cushion into an electrical outlet. The sensor 204 detects whether the user is present on the seat cushion 100 and provides an output signal to the microcontroller 200. The output signal may be amplified using an amplifier so that the microcontroller 200 can read it. The sensor 204 may have an analog or digital output depending on the microcontroller 200 specifications. The microcontroller 200 is shown and described later in FIG. 3. The microcontroller 200 may be an Arduino board, a Raspberry Pi, a Beagle bone or the like. The Arduino board is a single board microcontroller.

A number of sensor types may be used. For example, the sensor 204 may detect the user's weight in addition to the user's presence. In one embodiment, the sensor 204 may be a pressure sensor. In other embodiments, the sensor 204 may be a force sensor located on a base of the chair. In other embodiments, an infrared sensor may be positioned on back of a chair to detect distance to the user. The sensor 204 may be a load sensor. The sensor 204 may be that disclosed in U.S. Pat. No. 6,223,606B1 entitled "CENTER OF WEIGHT SENSOR", the entire disclosure of which is incorporated herein by reference.

The load sensor may include a load cell. The load cell is a transducer that creates an electrical signal with a magnitude proportional to the force being measured. Load cells typically employ strain gauges, piezoresistive, capacitive or piezoelectric sensors. Another type of sensor employs a spring. The spring have a spring constant which controls the amount of displacement. The sensor measures the amount of displacement for a given load. A displacement sensor measures the amount the spring is compressed which is used to determine the load on the spring. The sensor may be a Giant Magnetoresisteive effect (GMR) sensor. The sensor 204 may be one or more sensors strategically placed inside the seat cushion. The output signal from each sensor may then pass through an amplifier to a device such as the microcontroller 200 which processes the output signal, or signals, to determine a weight that the seat cushion 100 is bearing. Algorithms to translate the output signal to the weight are well known and are used for example in electronic bathroom scales.

The microcontroller 200 then may compare the weight with a predetermined threshold. In response to determining that the weight is below the predetermined threshold, the microcontroller 200 may determine that the sensor 204 may have detected an object or an animal. For example, the user may have placed the object on the seat cushion 100 such as a shopping bag. Thus, the microcontroller 200 may determine that the alarm 206 should not be activated at the predetermined times. The predetermined threshold may be 75 pounds. The predetermined threshold may also be set according to the user preference. The predetermined threshold is chosen to be below the weight of potential users. Thus, using the load sensor may decrease the risk of activating the alarm 206 when no person is sitting on the seat cushion 100.

In other embodiments, the microcontroller 200 may activate the alarm only when a predetermined user is sitting on the seat cushion 100. The microcontroller 200 may determine whether the predetermined user is sitting on the seat cushion 100 by checking whether the weight detected by the sensor 204 corresponds to a predetermined weight of the predetermined user. This features is beneficial when many users may sit on the seat cushion 100 and only the predetermined user wants to be alerted at the predetermined times such as prayer times. In selected embodiments, the microcontroller 200 may activate different operation mode of the seat cushion depending on the weight measured by the sensor 204. For example, the seat cushion 100 may have a "child" mode and an "adult" mode. The "child" mode and the "adult" mode may have different predetermined times. The predetermined times for the "adult" mode may correspond to the prayer times. On the other hand, the predetermined times in the "child" mode may correspond to a bedtime. For example, the microcontroller 200 in response to determining that the weight is below the predetermined threshold, may determine that the user is a child. The predetermined threshold may be equal to 100 pounds. In response to determining, that the user is a child, the "child" mode is activated. In response to determining that the weight is above the predetermined threshold, the microcontroller 200 determines that the user is an adult and the "adult" mode is activated. In the "child" mode, the bedtime may be configured by the user depending on the child weight (determined by the sensor). Table 1 shows an exemplary configuration set by the user.

TABLE 1

Exemplary configuration for the "child" mode

| Weight determined | Bedtime |
| --- | --- |
| 24-40 pounds | 6 pm |
| 40-50 pounds | 7 pm |
| 50-65 pounds | 8 pm |
| Over 65 pounds | 9 pm |

The memory may be a USB flash drive. The flash drive is removable from the seat cushion 100. The memory may be used to store the user log. The user log may contain the duration and the time the user was sitting on the seat cushion 100. The user may the display the user log on a personal computer. The user may print the user log.

The user log may be transmitted to the personal computer using the communication circuitry. The communication circuitry 208 may be a Xbee, XRF, or the like. The Xbee may use a plurality of RF frequencies including 2.4 GHZ, 902-928 MHz, and 865-868 MHz.

The alarm 206 may be one or more alarms. The alarm 206 may include a sensory alarm such as a vibrator. The vibrator may be similar to the one used in mobile phones. The vibrator may be housed inside the seat cushion. The vibrator may produce continuous or intermittent vibrations. The alarm 206 may also include a sound generator. The sound generator may play pre-recorder voice or musical segment. The sound generator may include an audio chip, a simple buzzer, or other similar sound producing mechanism. The audio chip may be similar to the one used in a musical greeting card or in toys. The alarm 206 may also include a light generator. The light generator may contain a light bulb, a light emitting diode, a fiber, a light guide, or other similar light producing mechanism as would be understood by one of ordinary skill in the art. The alarm may have an LED display that may show a message. For example, the LED display may show the prayer time type and instructions. The use of different types of alarm devices allows the seat cushion 100 to be used by users that may have disabilities such as blindness or deafness. The sensory alarm may also be in the form of a gentle warming or cooling sensation. A heater or a cooler, such as a peltier element, may be included in the seat cushion 100. Likewise a tactical sensation such as an extension of a plate in the seat cushion 100 that can be felt on the bottom of the user. In other embodiments, the tactical sensation may be from a massager such as used in massaging chair that provides kneading and rolling massage actions.

In selected embodiments, the alarm type used may be dependent on the prayer time. For example, a silent alarm such as the sensory alarm or the light alarm may be used for the pre-dawn prayer, such as not to interfere with other adjacent people (for example: sleeping children). Table 2 shows an exemplary setting of different type of alarms for different prayer times. The programmable type of alarms also indicates to the user which prayer it is.

TABLE 2

Exemplary alarm type corresponding to a prayer type.

| Prayer | Alarm type |
| --- | --- |
| "Fajr" | Sensory alarm: "heating sensation" |
| "Zuhr" | Sound alarm |
| "Asr" | Tactical sensation |
| "Maghrib" | Light alarm |
| "Isha" | Sensory alarm: "cooling sensation" |

Figure 3:
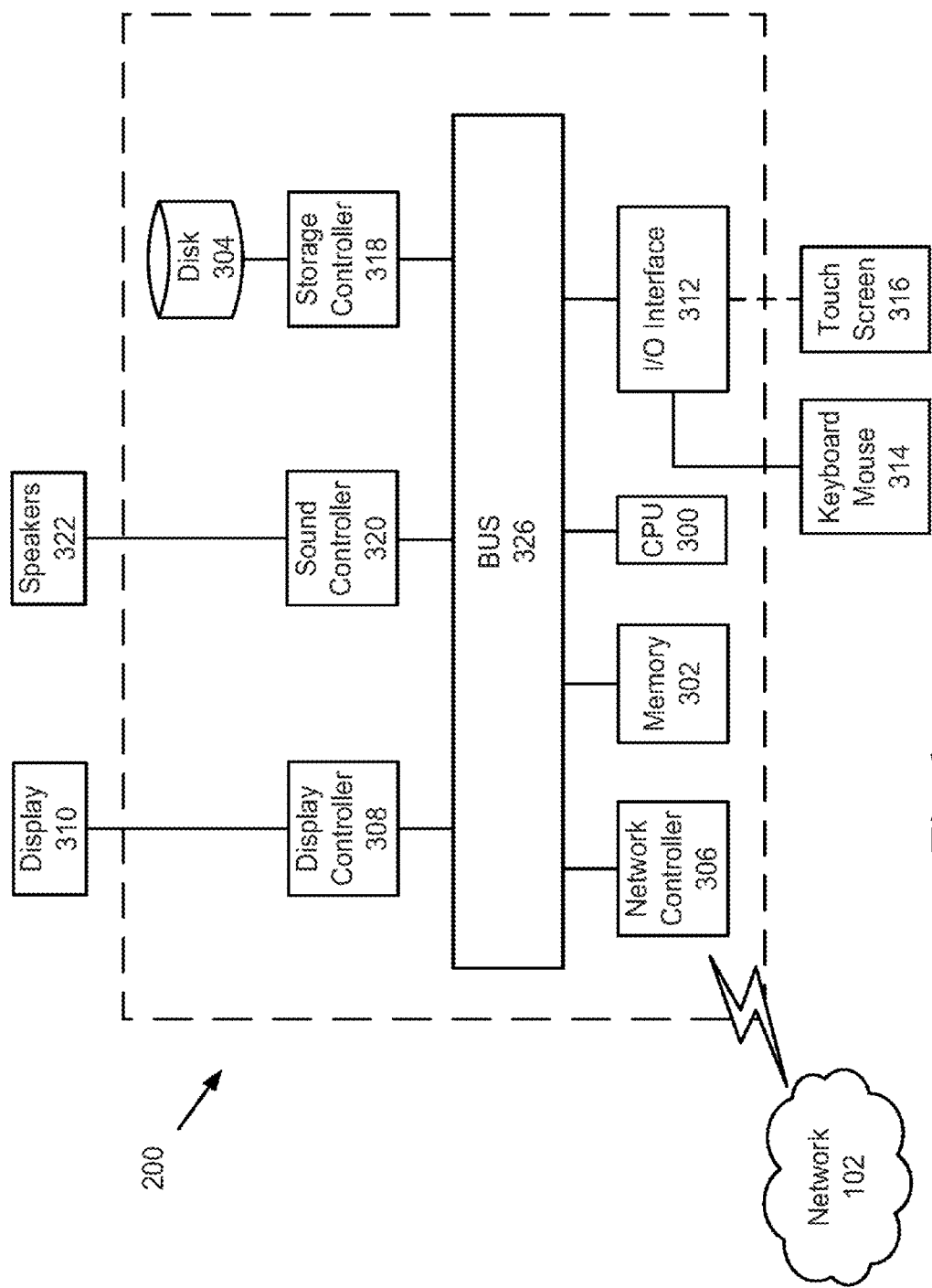
FIG. 3 is a block diagram representation of a microcontroller according to one example.

FIG. 3 is a block diagram representation of the microcontroller according to one example. In FIG. 3, the microcontroller 200 includes a CPU 300 which performs the processes described above. The process data and instructions may be stored in memory 302. These processes and instructions may also be stored on a storage medium disk 304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the microcontroller 200 communicates, such as the server or computer.

Further, the claimed advancements may be provided as a utility application, background daemon, or component of an operating system, or combination thereof, executing in conjunction with CPU 300 and an operating system such as Microsoft Windows 7, UNIX, Solaris, LINUX, Apple MAC-OS and other systems known to those skilled in the art.

CPU 300 may be a Xenon or Core processor from Intel of America or an Opteron processor from AMD of America, or may be other processor types that would be recognized by one of ordinary skill in the art. Alternatively, the CPU 300 may be implemented on an FPGA, ASIC, PLD or using discrete logic circuits, as one of ordinary skill in the art would recognize. Further, CPU 300 may be implemented as multiple processors cooperatively working in parallel to perform the instructions of the inventive processes described above.

The microcontroller 200 in FIG. 3 also includes a network controller 306, such as an Intel Ethernet PRO network interface card from Intel Corporation of America, for interfacing with network 102. As can be appreciated, the network 102 can be a public network, such as the Internet, or a private network such as an LAN or WAN network, or any combination thereof and can also include PSTN or ISDN sub-networks. The network 102 can also be wired, such as an Ethernet network, or can be wireless such as a cellular network including EDGE, 3G and 4G wireless cellular systems. The wireless network can also be WiFi, Bluetooth, or any other wireless form of communication that is known.

The microcontroller 200 may include a display controller 308, such as a NVIDIA GeForce GTX or Quadro graphics adaptor from NVIDIA Corporation of America for interfacing with display 310. A general purpose I/O interface 312 may interface with a keyboard 314 as well as a touch screen panel 316 on or separate from display 310. The keyword may be removed when the seat cushion 100 is in use.

A sound controller 320 is also provided in the microcontroller 200, such as Sound Blaster X-Fi Titanium from Creative, to interface with speakers/microphone 322 thereby providing sounds and/or music that may be used by the alarm 206.

The general purpose storage controller 318 connects the storage medium disk 304 with communication bus 326, which may be an ISA, EISA, VESA, PCI, or similar, for interconnecting all of the components of the microcontroller 200. A description of the general features and functionality of the display 310, keyboard, as well as the display controller 308, storage controller 318, network controller 306, sound controller 320, and general purpose I/O interface 312 is omitted herein for brevity as these features are known.

Figure 4:
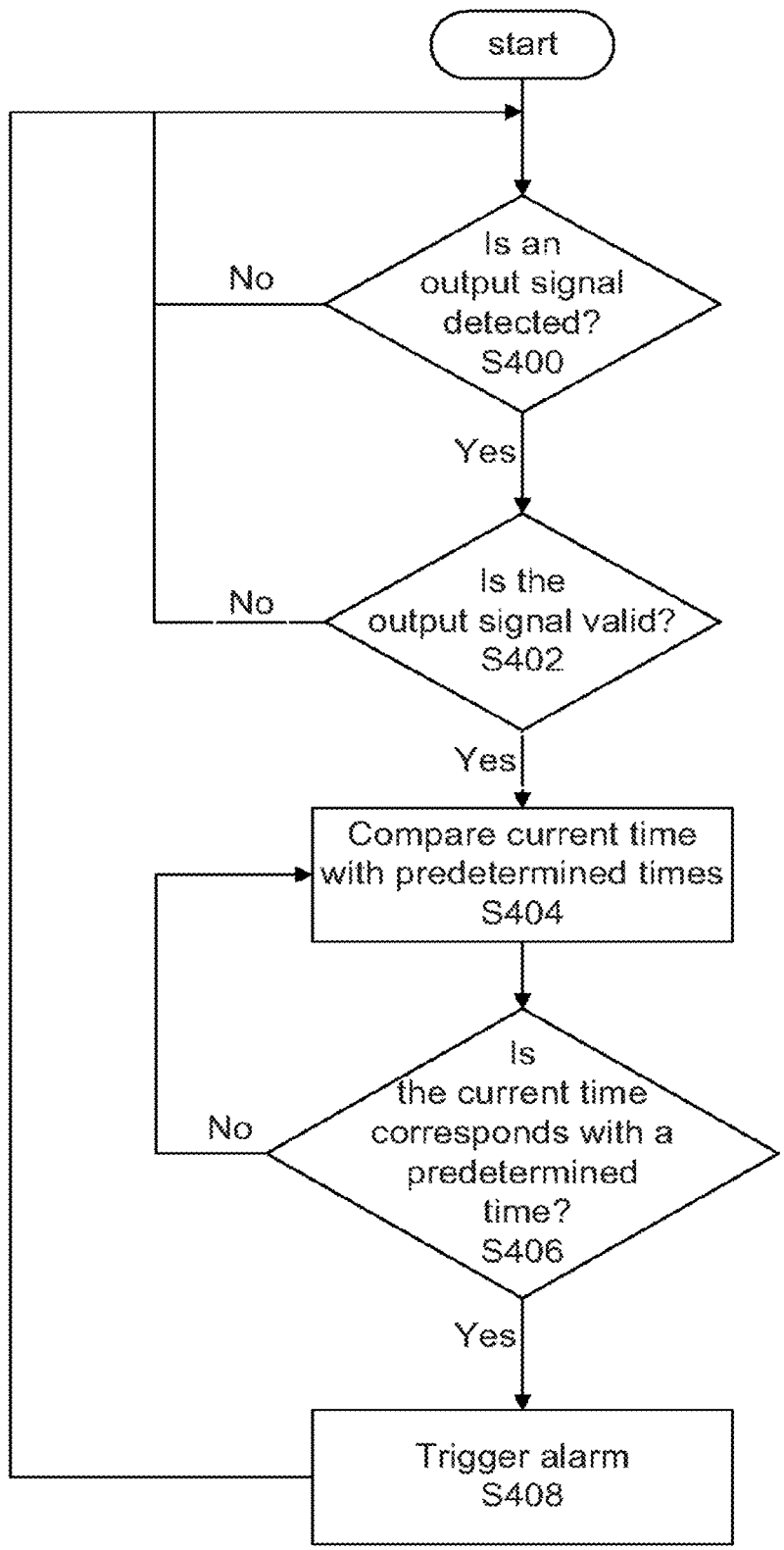
FIG. 4 is an exemplary flow chart that shows the operation of a seat cushion with a prayer reminder system according to one example.

FIG. 4 is a flow chart that shows the activation of an alarm used in the cushion prayer according to one example. At S400, the microcontroller 200 may check whether the output signal is detected. The output signal is generated and sent by the sensor 204. In response to determining that the output signal is detected, the microcontroller 200 may analyze the output signal at step S402. The microcontroller 200 may check whether the output signal is valid by comparing the weight to the predetermined threshold as explained in FIG. 2. In response to determining that the output signal is valid, the process goes to S404. In response to determining that the output signal is not valid, the process goes to S400. At S404, the microcontroller 200 may compare a current time obtained from an internal clock with the predetermined times. The predetermined times may be stored in the memory 202. In selected embodiments, the predetermined times may be obtained via the network 102 from the server 104. At step S406, the microcontroller may determine whether the current time corresponds with the predetermined time. In response to determining that the current time corresponds with the predetermined time, the microcontroller 200 may trigger the alarm 206 at step S408. The microcontroller 200 may activate multiple types of alarm to ensure the user is alerted. The different types of alarms works with different senses of the user. In other embodiments, the alarm may provide an audible and/or visual indication. The alarm may be activated for a predetermined duration according to the user preference. For example, the predetermined duration may be one minute. In other embodiments, the alarm may stay active until the user turns it off using an ON/OFF switch. In other embodiments, the alarm 206 may be activated until the microcontroller 200 stops detecting the output signal from the sensor 204.

Figure 5:
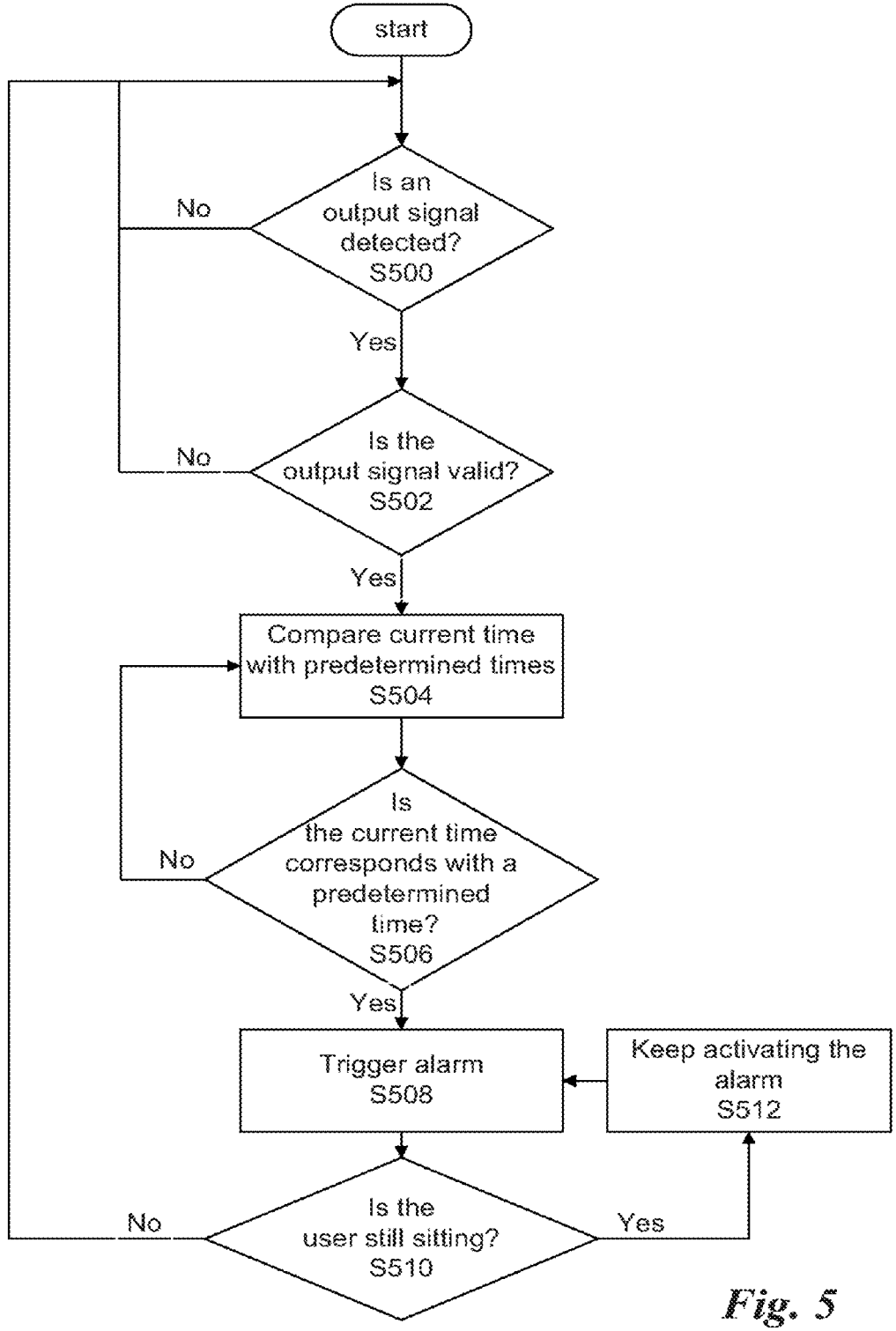
FIG. 5 is an exemplary flow chart that shows the operation of a seat cushion with a prayer reminder system according to one example.

FIG. 5 is a flow chart that shows the activation of the alarm used in the seat cushion with the prayer system according to one example. At S500, the microcontroller 200 may check whether the output signal is detected. The output signal is generated and sent by the sensor 204. In response to determining that the output signal is detected, the microcontroller 200 may analyze the output signal at step S502. The microcontroller 200 may check whether the output signal is valid. In response to determining that the output signal is valid, the process goes to S504. In response to determining that the output signal is not valid, the process goes to S500. At S504, the microcontroller 200 may compare the current time obtained from the internal clock with the predetermined times. At step S506, the microcontroller 200 may determine whether the current time corresponds with the predetermined time. In response to determining that the current time corresponds with the predetermined time, the microcontroller 200 may trigger the alarm at step S508. At step S510, the microcontroller 200 may check whether the user has moved from the sitting position by checking whether the output signal is detected from the sensor 204. In response to determining that the user is still sitting, the microcontroller 200 may reactivate the alarm at S512. The sound alarm may be activated with a higher volume. In other embodiments, the microcontroller may activate additional alarms types such as the vibrator. In other embodiments, the alarm may have a higher number of buzz.

Figure 6:
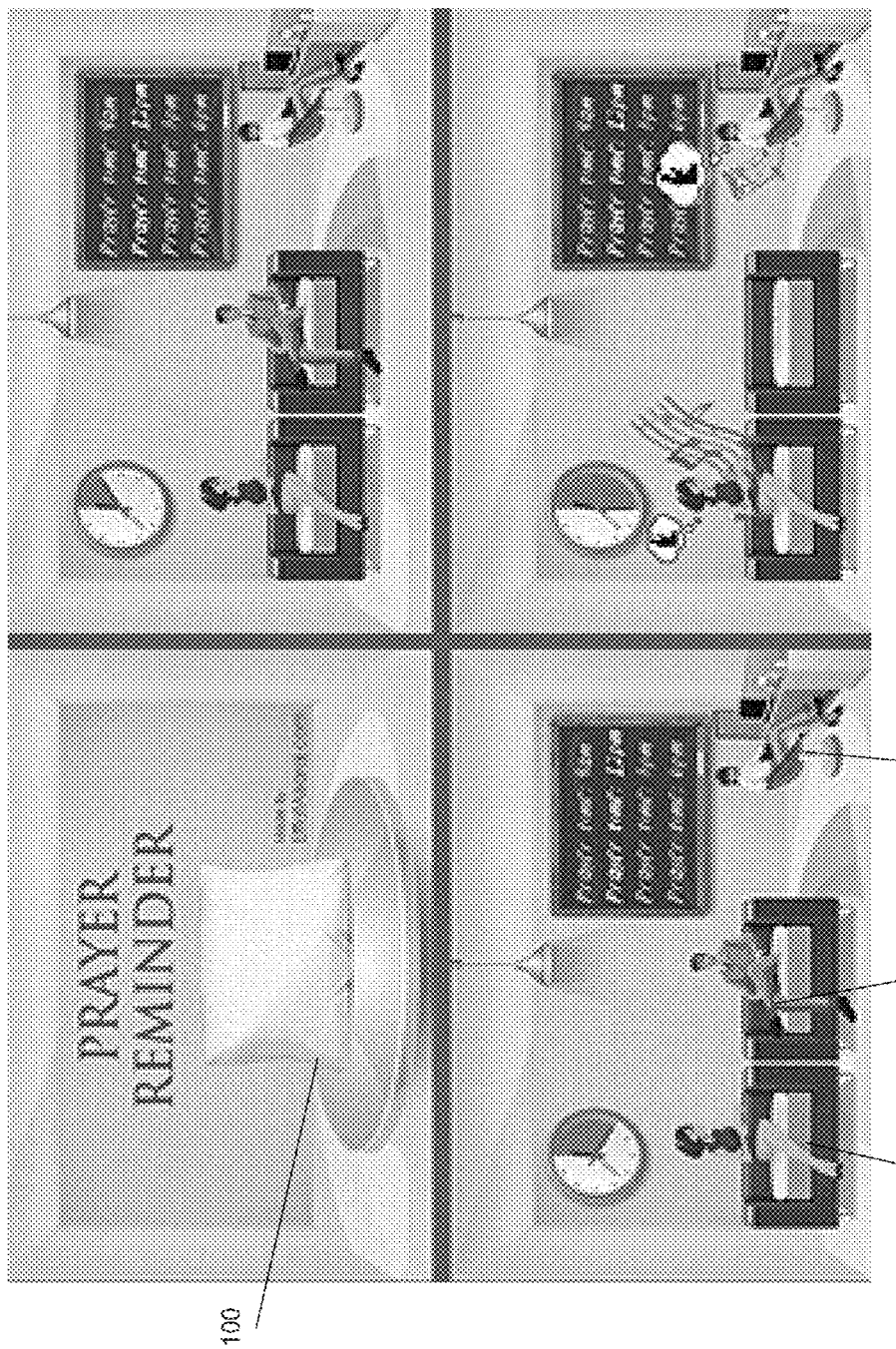
FIG. 6 is a schematic representation that shows a seat cushion with a prayer reminder system according to one example.

FIG. 6 is a schematic representation that shows the seat cushion with the prayer reminder system according to one example. FIG. 6 shows the seat cushion 100 with the prayer reminder system and a plurality of users 600, 602, 604.

Figure 7:
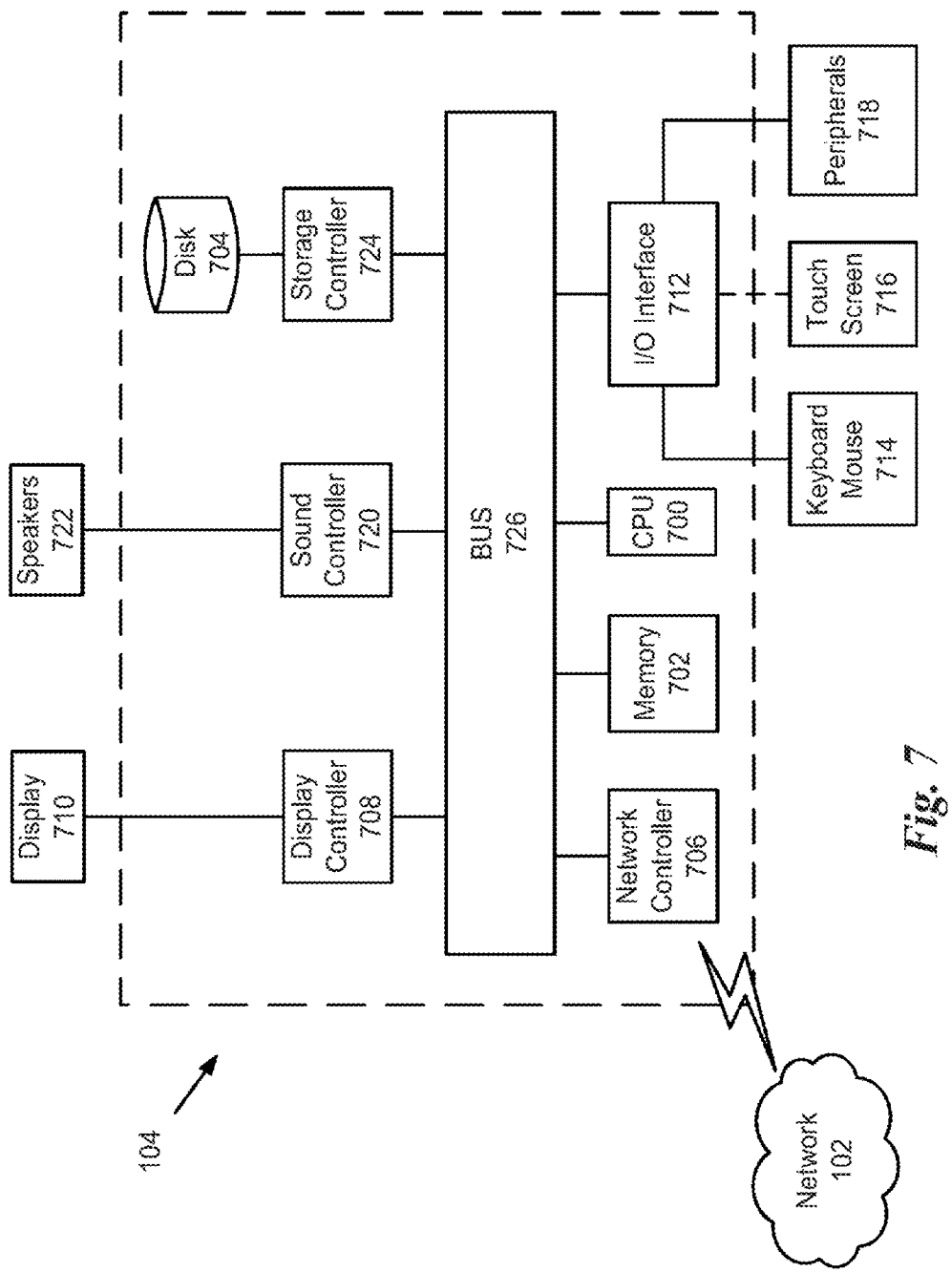
FIG. 7 is a block diagram representation of a server according to one example.

FIG. 7 is a block diagram representation of the server according to one example. In FIG. 7, the server includes a CPU 700 which performs the processes described above. The process data and instructions may be stored in memory 702. These processes and instructions may also be stored on a storage medium disk 704 such as a hard drive (HDD) or portable storage medium or may be stored remotely. CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The server 104 in FIG. 7 also includes a network controller 706, such as an Intel Ethernet PRO network interface card from Intel Corporation of America, for interfacing with the network 102. The server 104 further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the server 104, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the server. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The seat cushion with the prayer reminder system which includes the features in the foregoing description provides numerous advantages to users. In particular, the device help the users to remember prayer times while sitting and performing other activities such as watching television. The device is non-intrusive. In addition, the seat cushion has the advantage to trigger the alarm only when the user is sitting on it.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A seat cushion, comprising:
   a sensor housed within the seat cushion for generating an output signal in response to detecting a weight of a user;
   an alarm device, wherein the alarm device generates at least one auditory signal and at least one non-auditory signal; and
   a microcontroller configured to
      receive the output signal from the sensor,
      operate in a child mode when the weight of the user is detected to be less than a threshold weight and in an adult mode when the weight of the user is at or above the threshold weight, and
      activate the alarm device at predetermined times,
   wherein the predetermined times correspond to five Islamic prayer times determined based on the seat cushion location and a current date and time when operating in the adult mode, the predetermined times being based on the weight of the user when operating in the child mode, and the at least one auditory signal and at least one non-auditory signal from the alarm device are pre-programmed by the user for a prayer time that corresponds with the current time, and wherein the alarm device generates an auditory signal of the at least one auditory signal at one of the five Islamic prayer times and generates a non-auditory signal of the at least one non-auditory signal at a different one of the five Islamic prayer times.

2. The seat cushion of claim 1, wherein the alarm device includes at least one of a vibrator, a sound generator, and a light generator.

3. The seat cushion of claim 1, further comprising a sensory alarm wherein the sensory alarm is a peltier element.

4. The seat cushion of claim 1, wherein the predetermined times are obtained from a server using communication circuitry.

5. The seat cushion of claim 1, wherein the predetermined times are stored in a memory.

6. The seat cushion of claim 5, wherein the memory is removable and used to store a user log.

7. The seat cushion of claim 1, wherein the microcontroller is further configured to:

obtain the weight of the user from a load sensor;

determine whether the output signal is valid by comparing the weight of the user to the threshold weight stored in a memory; and activate the alarm device at the predetermined times in response to determining that the output signal is valid.

8. The seat cushion of claim 1, wherein the microcontroller is further configured to:

determine whether the user has responded to the alarm device by detecting the output signal; and reactivate the alarm device in response to determining that the user has not responded to the alarm device.

9. A prayer reminder system, comprising:

a seat cushion;

a sensor housed within the seat cushion for generating an output signal in response to detecting a weight of a user;

an alarm device, wherein the alarm device generates at least one auditory signal and at least one non-auditory signal; and a microcontroller configured to receive the output signal from the sensor, operate in a child mode when the weight of the user is detected to be less than a threshold weight and in an adult mode when the weight of the user is at or above the threshold weight, and activate the alarm device at predetermined times, wherein the predetermined times correspond to five Islamic prayer times determined based on the seat cushion location and a current date and time when operating in the adult mode, the predetermined times being based on the weight of the user when operating in the child mode, and the at least one auditory signal and at least one non-auditory signal from the alarm device are pre-programmed by the user for a prayer time that corresponds with the current time, and wherein the alarm device generates an auditory signal of the at least one auditory signal at one of the five Islamic prayer times and generates a non-auditory signal of the at least one non-auditory signal at a different one of the five Islamic prayer times.

* * * * *